United States Patent

[11] 3,604,255

| [72] | Inventor | Hans U. Bart |
| | | Whitehall, Mich. |
| [21] | Appl. No. | 13,125 |
| [22] | Filed | Feb. 20, 1970 |
| [45] | Patented | Sept. 14, 1971 |
| [73] | Assignee | Teledyne Industries, Inc. |
| | | Los Angeles, Calif. |

[54] POWER METER FOR ROTATING SHAFTS AND METHOD OF PROVIDING POWER READOUT THEREFOR
13 Claims, 6 Drawing Figs.

| [52] | U.S. Cl. | 73/136 A |
| [51] | Int. Cl. | G01l 3/10 |
| [50] | Field of Search | 73/136 |

[56] References Cited
UNITED STATES PATENTS

| 2,640,352 | 6/1953 | Ellison et al. | 73/136 |
| 2,766,617 | 10/1956 | Tyler et al. | 73/136 |
| 2,911,826 | 11/1959 | Kritz | 73/194 |
| 3,095,734 | 7/1963 | Mayer | 73/136 |

Primary Examiner—Charles A. Ruehl
Attorney—Hauke, Gifford and Pataldis

ABSTRACT: A pair of proximity pickups located adjacent a pair of axially spaced gears on a rotating shaft generate alternating current waves in response to movement of the gear teeth, the waves being converted to rectangular waves through wave shapers and transmitted to a flip-flop to yield a rectangular wave the width of which is the lag of one of the input waves behind the other due to torque on the shaft so that the width of the wave is proportional to torque. One of the signals from the flip-flop is directed to a monostable multivibrator the output of which provides an r.p.m. readout for the shaft. The rectangular waves representing torque are transmitted to an analog gate which is opened by the leading vertical edges of tee input waves thereto, the energy entering said analog gate when opened being derived from a voltage integrator which converts voltage pulses from the monostable multivibrator into an integrated voltage value proportional to the rotational speed of the shaft. The result is that the analog gate produces a final, substantially rectangular wave having a width proportional to torque and an amplitude proportional to the rotational speed of the shaft so that the area beneath the wave is proportional to the horsepower delivered by the shaft.

PATENTED SEP 14 1971 3,604,255
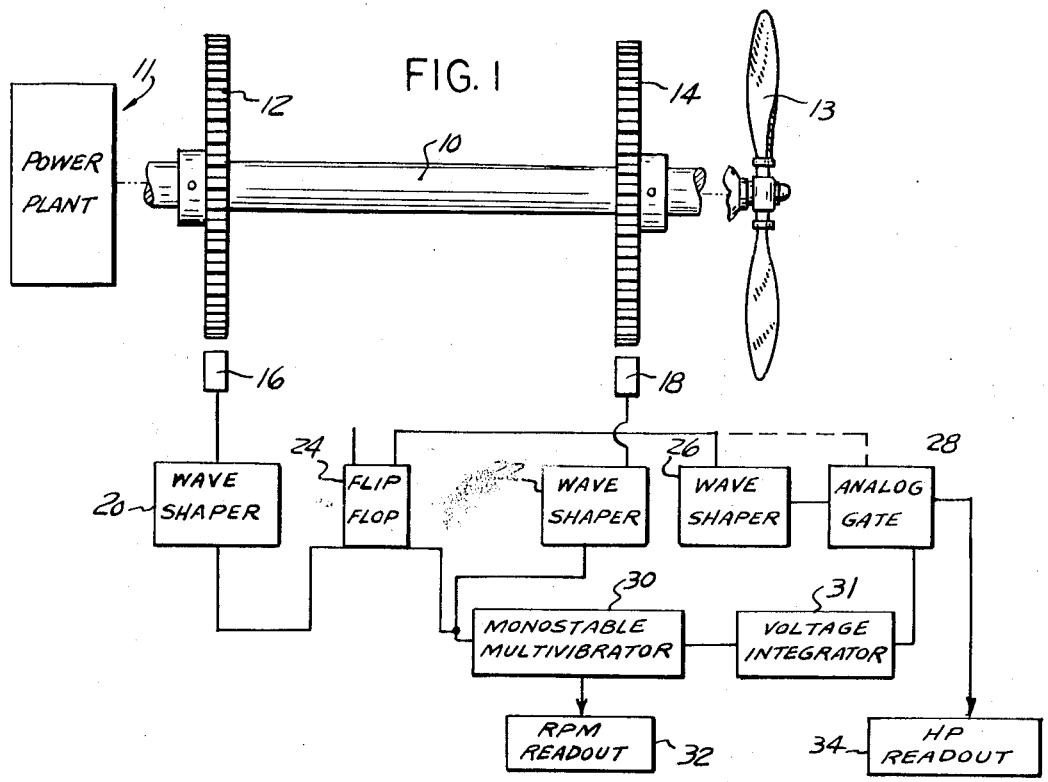
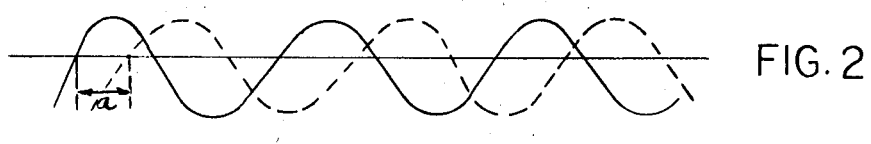
FIG. 2
FIG. 3
FIG. 4
FIG. 5
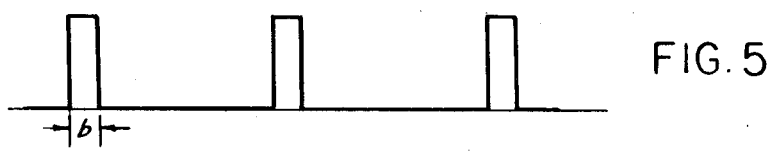
FIG. 6
INVENTOR
HANS U. BART
BY Hauke, Gifford & Patalidis
ATTORNEYS

POWER METER FOR ROTATING SHAFTS AND METHOD OF PROVIDING POWER READOUT THEREFOR

BACKGROUND OF THE INVENTION

I. Field of the Invention

The present invention relates to the measurement of horsepower delivered from a power source, such as an aircraft engine or the like, to a mechanical load, such as an aircraft propeller, by sensing torque transmitted to a rotating shaft as well as the speed of the shaft, utilizing electronic means to multiply these values to obtain horsepower, and transmitting the resultant information to a horsepower readout device so that the horsepower may be directly read or used in any desired fashion.

II. Description Of The Prior Art

A common method of measuring the torque of a rotating shaft involves the generating of alternating current waves at two spaced locations on the shaft. Torque is then determined by measuring the change in the phase lag of the wave from one location compared to the wave from the other location, increased torque causing an increased angular displacement of the signal effecting elements. For example: Smith et al. in U.S. Pat. No. 1,685,964; Mayer in U.S. Pat. No. 3,095,734; Kuhrt et al. in U.S. Pat. No. 3,170,323; Wilson in U.S. Pat. No. 3,194,065; and Holdsworth in U.S. Pat. No. 3,377,850 use variations of this scheme to measure torque. Further, facility of the measurement has been accomplished by converting the alternating current waves into rectangular waves. (For example: Mayer, Wilson and Kuhrt et al.)

Power being delivered by a rotating shaft has also been determined by multiplying torque by rotational speed. Thus, Smith et al. measures torque as described above and uses a shaft of constant speed or, alternatively, calibrates the power of each shaft involved at each value of torque. Holdsworth measures torque as described above and uses a coulometer as the multiplier. Barg in U.S. Pat. No. 3,251,223 measures torque as a voltage from a strain gauge and measures speed as a pulse train from magnetic signal elements rotatable with the shaft, an electronic device serving as the multiplier.

To the best of my knowledge, no prior art device has been able to successfully determine the horsepower of an operating aircraft engine, for example, such devices as coulometers and strain gauges being totally impractical. Pilots still make manual calculations of horsepower in order to determine the fuel supply to the engine.

SUMMARY OF THE INVENTION

The present invention is of a useful method and apparatus for the measurement of torque, speed and horsepower of a rotating shaft, these measurements being made in such a manner that the numerical value of the horsepower being delivered through the shaft can be read directly from a meter, and additionally provides aircraft pilots with an engine horsepower reading which does not require them to make other calculations.

The present apparatus includes a first and a second means such as proximity pickups respectively located adjacent the teeth of gears mounted at axially spaced positions on a shaft connecting the power to the load, the output of the proximity pickups being in the form of voltage or alternating current waves which are then converted by wave shapers into first and second rectangular waves respectively and transmitted to a flip-flop arranged such that the leading vertical edge of one rectangular wave turns on the flip-flop and the leading vertical edge of the second rectangular wave turns off the flip-flop, to yield a third rectangular wave the width of which is proportional to the lag of one wave behind the other. The lag is produced by the torsional displacement of one gear relative to the other and is therefore proportional to torque on the shaft. The resulting rectangular wave from the flip-flop is transmitted to an analog gate which is opened by a leading vertical edge of an input wave and closed by the trailing vertical edge of the same wave. The voltage pulse from one of the wave shapers is also transmitted, preferably through a monostable multivibrator, to a voltage integrator for converting voltage pulses to an integrated voltage value which is proportional to the rotational speed of the shaft, the integrated voltage being then transmitted to the analog gate. The energy entering the analog gate, when opened, is derived from this integrated voltage to yield a fourth rectangular wave. The area under this latter wave, being torque times speed, is proportional to the horsepower delivered by the shaft and can be directly transmitted to a horsepower readout or other suitable device. Additionally, a further wave shaper may be interposed between the flip-flop and the analog gate to stabilize the shape of the wave from the flip-flop, and a direct r.p.m. readout may receive a suitable signal from the monostable multivibrator.

DESCRIPTION OF THE DRAWING

A complete understanding of the invention may be had by reference to the accompanying drawing illustrating a preferred embodiment thereof in which like reference characters refer to like parts throughout the several views and in which:

FIG. 1 is a diagrammatic representation of the preferred embodiment of the invention;

FIG. 2 illustrates the two alternating waves generated at spaced locations on the rotating shaft;

FIG. 3 illustrates the first and second rectangular waves formed from the alternating current waves of FIG. 2;

FIG. 4 illustrates the rectangular wave formed by the flip-flop, the width of which wave indicates torque;

FIG. 5 illustrates the rectangular wave formed by the monostable multivibrator, the frequency of which represents r.p.m. and FIG. 6 illustrates the rectangular wave formed by the analog gate the area of which represents horsepower.

DESCRIPTION OF THE PREFERRED EMBODIMENT

Referring more particularly to FIG. 1, a shaft 10, preferably connecting the output of a power source such as an aircraft power plant 11 with a load such as an aircraft propeller 13, is provided with a gear 12 at its power input end and a gear 14 at its load end. Gears 12 and 14 have the same number of teeth. Proximity pickups 16 and 18 designed to generate alternating current waves in response to movement of the gear teeth 12 and 14 are positioned respectively near the periphery of the gears as shown. Wave shapers 20 and 22, are each designed to convert one half of an alternating current wave into a rectangular wave and are wired respectively to the pickups 16 and 18.

The wave shapers 20 and 22 are wired to a flip-flop 24 in a manner such that, when the flip-flop is off, the leading edge of a rectangular wave will turn it on, and the leading edge of a following rectangular wave will turn it off. The flip-flop 24 is connected to another wave shaper 26 which, although preferred, may be optional as will be explained more fully hereinafter. The wave shaper 26, when present, is wired to an analog gate 28 as shown. When the wave shaper 26 is not present, the flip-flop is wired directly to the analog gate 28 as indicated by the phantom line in the diagram.

The wave shaper 22 is wired to a monostable multivibrator 30 and, when triggered by a wave from the wave shaper, the monostable multivibrator 30 produces waves of constant width. The monostable multivibrator 30 is wired to a voltage integrator 31 which, in turn, is wired to the analog gate 28. A speed or r.p.m. readout such as a meter 32 is wired to the monostable multivibrator 30, and a horsepower readout such as a meter 34 is wired to the analog gate 28.

The individual electrical devices referred to in FIG. 1 are all well known in the art and are available commercially. The operation of the device is as follows:

As the gear 12 rotates and the movement of the gear teeth causes a changing metal environment and thus a changing magnetic field near the proximity pickup 16, an alternating current wave is generated therein. Similarly, a second alternating wave is generated in the proximity pickup 18 by the rotation of gear 14.

If there is no load on the shaft 10, and if the teeth of the gear 12 are perfectly aligned with the teeth of the gear 14, the two alternating current waves will be in phase. When a load is put on the shaft 10 the right as shown in FIG. 1), the teeth on the gear 14 will be displaced angularly relative to the teeth on gear 12 due to the torsional displacement of the shaft between the gears 12 and 14. This effects a lag of dimension "a" of the alternating current wave induced by the gear 14 behind the wave induced by the gear 12, as indicated respectively by the dash and solid lines in FIG. 2. The degree of such lag "a" is proportional to the torque on the shaft 10.

The first alternating current wave or voltage wave generated in the pickup 16 is transmitted to the wave shaper 20 where one half of the wave is converted to a first rectangular wave. Similarly, the second alternating wave generated in the pickup 18 is converted to a second rectangular wave in the wave shaper 22. The resulting waves are indicated respectively by the solid and dash lines of FIG. 3, and will differ by the aforesaid lag dimension "a" as shown.

The first and second rectangular waves are then transmitted to the flip-flop 24 which is wired so that the leading edge of the first rectangular wave input turns on the flip-flop and the leading edge of the second rectangular wave input turns it off. The resultant torque wave produced by the flip-flop is thus a third rectangular wave the width of which is equal to the lag "a" of the second rectangular wave behind the first rectangular wave as indicated in FIG. 4, and is thus equal to the lag of the second alternating current wave behind the first. The width of the torque wave formed by the flip-flop is therefor proportional to the torque on the shaft 10.

This torque wave is then transmitted to the analog gate 28 directly or, if desired, may be more suitably shaped by being passed through the wave shaper 26 which, for example, may be a Schmitt Trigger. The wave shaper 26 is used to stabilize the wave from the flip-flop at a constant height and I prefer to include such a wave shaper. However, in specific systems and with more suitable electrical devices, one may find the wave from the flip-flop to be of suitable stability without reshaping.

The speed of rotation of the shaft 10 is determined from the rate of generation of waves in one of the pickups 16 or 18. As indicated in FIG. 1, rectangular waves from the wave shaper 22 are directed into a monostable multivibrator 30 which converts these waves into a series of pulses or waves of equal width as shown in FIG. 5. The number of such pulses formed per unit of time is proportional to the rotational speed of the shaft 10 and thus the output from the monostable multivibrator 30 can be led directly to a meter or the like 32 to provide a means for indicating r.p.m. of the shaft 10. The pulses from the monostable multivibrator 30 are also passed through the voltage integrator 31 to form a single, integrated value voltage, proportional to shaft speed, which is fed to the analog gate 28.

The analog gate 28 is arranged to generate a rectangular wave and is wired such that it is opened by the leading vertical edge of the input torque wave and closed by the trailing vertical edge of the input torque wave. The height of the rectangular wave is determined by the voltage transmitted from the voltage integrator 31. The rectangular wave from the analog gate 28, as indicated in FIG. 6 then has a width "a" proportional to torque, a height "b" proportional to speed, and an area "ab" (torque times speed) which is therefore proportional to horsepower. The suitably calibrated meter, or r.p.m. readout 32, indicates the numerical value of speed in revolutions per minute of the shaft 10 and the suitably calibrated meter, or horsepower readout 34, indicates the numerical value of the power in horsepower.

While it has been preferred to describe a system in which the pulses representing shaft speed have been integrated and the torque wave has been utilized to open and close the analog gate with suitable modifications the torque wave could be integrated and the shaft speed wave could actuate the analog gate.

The successful operation of the flip-flop 24 in the present device requires that the first wave (from the wave shaper 20) precede the second wave (from waver shaper 22). Because rotating shafts are subject to torsional vibrations which can cause periodic angular displacements sufficiently large to cause the above described second wave to precede the first wave, it is preferred that the teeth on the gear 12 (input end) be advanced several angular degrees ahead of the teeth on the gear 14 (load end) at zero torque. The extent of such advancement will depend on the specific shaft and other structure involved but must be at least equal to the amplitude of the largest expected torsional vibrations induced in the shaft in any power range or at any shaft load. In one application of primary interest to me, where the torque is applied to a crankshaft of an airplane engine and the load is a propeller, I advanced the gear teeth on the power input side of the shaft about two degrees. Naturally, with such an advancement at zero torque, the horsepower readout 34 will need to be calibrated to indicate zero horsepower when it receives the resultant wave signal from the analog gate 28.

Although I have described but one embodiment of my invention, it will be apparent to one skilled in the art that various changes and modifications may be made therein without departing from the spirit of the invention as expressed in the appended claims.

I claim:

1. An apparatus for measuring the horsepower of a rotating shaft having a power input end and a load end comprising means for generating first and second alternating current waves which are variably out of phase proportionally to the torque-effected torsional displacement between axially spaced positions of said shaft, means converting said waves to first and second rectangular waves and indicating the lag of one rectangular wave behind the other to form a third rectangular wave having a width proportional to the torque on said shaft, means converting one of said alternating current waves to a fourth rectangular wave the frequency of which is proportional to shaft speed, means for converting said third rectangular wave and said fourth rectangular wave to a fifth wave having an area proportional to horsepower.

2. The apparatus as defined in claim 1 and in which said last mentioned means comprises an analog gate connected so that it is opened by the leading vertical edges of one of said last-mentioned rectangular waves and closed by the trailing vertical edges thereof, and a voltage integrator connected with said analog gate, said voltage integrator receiving the other of said last-mentioned rectangular waves for converting same to an integrated voltage value and directing the integrated voltage to the analog gate.

3. An apparatus for measuring the horsepower of a rotating shaft having a power input end and a load end, including a first and a second means generating first and second alternating current waves which are variably out of phase proportionally to the torque-effected torsional displacement between axially spaced positions of said shaft, a third and fourth means respectively converting said waves to first and second rectangular waves, a fifth means indicating the lag of one rectangular wave behind the other, and a sixth means indicating the speed of rotation of said shaft in the form of voltage pulses, the improvement which comprises:

said fifth means comprising a flip-flop device connected with said third and fourth means and arranged such that the leading edge of said first rectangular wave turns on said flip-flop and the leading edge of said second rectangular wave turns off said flip-flop to yield a resulting third rectangular wave having a width representing the aforesaid lag between the first and second rectangular wave, a voltage integrator converting said voltage pulses to an integrated voltage value proportional to the rotational speed of said shaft, and an analog gate connected with said flip-flop and said voltage integrator such that it is opened by the leading vertical edges of said third rectangular wave and closed by the trailing vertical edges thereof, the energy entering said gate when opened being said integrated voltage, whereby the area under a resulting fourth rectangular wave produced by said analog gate represents the horsepower of said shaft.

4. The apparatus as in claim 3 including a wave shaper connecting said flip-flop to said analog gate and operable to stabilize said third rectangular wave at a constant height and to feed such stabilized wave to said analog gate.

5. The apparatus as in claim 3 wherein said sixth means comprises a monostable multivibrator.

6. The apparatus as in claim 3 including a horsepower meter connected with said analog gate and calibrated to indicate the numerical value of the horsepower as represented by the area under said fourth rectangular wave.

7. The apparatus as in claim 3 wherein two gears having equal numbers of teeth are fixed respectively at said axially spaced positions on said shaft for rotation therewith and said first and second means comprise proximity pickups positioned respectively near the peripheries of said gears.

8. The apparatus as in claim 3 wherein the gear at the power input end of said shaft is fixed such that at zero torque the teeth thereon are advanced ahead of the corresponding teeth of the other gear.

9. The apparatus as in claim 3 wherein the input end of said shaft is driven by an aircraft power plant and the load on the load end of said shaft is an aircraft propeller.

10. The apparatus as in claim 9 wherein two gears having equal numbers of teeth are fixed respectively at said axially spaced positions on said shaft for rotation therewith, said first and second means comprise proximity pickups positioned respectively near the peripheries of said gears, the gear at the power plant input end of said shaft being fixed such that, at zero torque, the teeth thereon are advanced ahead of the corresponding teeth on the gear at the propeller load end of said shaft an angular degree at least equal to the amplitude of the largest torsional vibrations induced in said shaft in any power range, and wherein said apparatus includes a horsepower meter calibrated to indicate the numerical value of the horsepower determined by said fourth rectangular wave.

11. In a method of measuring the horsepower of a rotating shaft having a power input end and a load end, including the steps of generating first and second alternating current waves which are variably out of phase proportionally to the torque-effected torsional displacement between axially spaced positions of said shaft, converting said alternating current waves into respectively first and second rectangular waves, and forming an integrated voltage proportional to the rotational speed of said shaft, the improvement which comprises the steps of:

forming from said first and second rectangular waves a third rectangular wave of a width equal to the lag of one of the first-mentioned rectangular waves behind the other, and forming a fourth rectangular wave from said third rectangular wave of a width equal thereto and a height proportional to said integrated voltage.

12. The method as in claim 11 including the step of stabilizing said third rectangular wave at a constant height following its formation.

13. The method as in claim 11 including the step of effecting a phase lag at zero torque on said shaft of the alternating current wave from said load end of said shaft behind the alternating current wave from said power input end of said shaft, said lag being approximately sufficient to compensate for torsional vibrations at any load on said shaft.